(12) United States Patent
Leijon

(10) Patent No.: US 6,940,380 B1
(45) Date of Patent: *Sep. 6, 2005

(54) TRANSFORMER/REACTOR (75) Inventor: Mats Leijon, Västerås (SE)

(73) Assignee: ABB AB, Vasteras (SE)

( * ) Notice: Subject to any disclaimer, the term of this patent is extended or adjusted under 35 U.S.C. 154(b) by 0 days.

This patent is subject to a terminal disclaimer.

(21) Appl. No.: 08/973,210

(22) PCT Filed: May 27, 1997

(86) PCT No.: PCT/SE97/00875

§ 371 (c)(1), (2), (4) Date: Apr. 3, 1998

(87) PCT Pub. No.: WO97/45847

PCT Pub. Date: Dec. 4, 1997

(30) Foreign Application Priority Data

May 29, 1996 (SE) .............................. 9602079
Feb. 3, 1997 (SE) .............................. 9700335

(51) Int. Cl.$^7$ ............................................ H01F 27/08
(52) U.S. Cl. ................. 336/60; 174/DIG. 25; 174/DIG. 24; 174/DIG. 13
(58) Field of Search .................. 174/DIG. 13–DIG. 33; 336/60, 59, 61; 310/45; 148/269

(56) References Cited

U.S. PATENT DOCUMENTS

| 295,699 A | 11/1884 | Smith et al. |
| 681,800 A | 9/1901 | Lasche |
| 847,008 A | 3/1907 | Kitsee |
| 1,304,451 A | 5/1919 | Burnham |
| 1,418,856 A | 6/1922 | Williamson |
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |

(Continued)

FOREIGN PATENT DOCUMENTS

| AT | 399790 | 7/1995 |
| BE | 565063 | 2/1957 |
| CH | 391071 | 4/1965 |
| CH | SU 266037 | 10/1965 |
| CH | 534448 | 2/1973 |

(Continued)

OTHER PUBLICATIONS

A test installation of a self–tuned ac filter in the Konti–Skan 2 HVDC link; T. Holmgren,G. Asplund, S. Valdemarsson, P. Hidman of ABB; U. Jonsson of Svenska Kraftnat; O. Ioof of Vattenfall Vastsverige AB; IEEE Stockholm Power Tech Conference Jun. 1995, pp 64–70.

(Continued)

Primary Examiner—Tuyen T Nguyen
(74) Attorney, Agent, or Firm—Dykema Gossett PLLC (57) ABSTRACT The present invention relates to a power transformer/reactor (14, 15, 16) for high voltages, comprising at least one winding having at least one current-carrying conductor. The winding comprises a solid insulation (7) surrounded by outer and inner layers (8,6) serving for equalization of potential and having semiconducting properties. The layers (6,8) and the insulation (7) adhere along essentially the whole of its contact surfaces. Said conductor is arranged interiorly of the inner semiconducting layer (6). The outer layer (8) is connected to ground or otherwise relatively low potential. Said solid insulation in the windings constitute substantially the total electrical insulation in the power transformer/reactor.

30 Claims, 1 Drawing Sheet

U.S. PATENT DOCUMENTS

| | | |
|---|---|---|
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,962,679 A | 11/1960 | Stratton |
| 2,975,309 A | 3/1961 | Seidner |
| 3,014,139 A | 12/1961 | Shildneck |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahsourian |
| 3,644,662 A | 2/1972 | Salahsourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky et al. |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |
| 4,238,339 A | 12/1980 | Khutoretsky et al. |
| 4,239,999 A | 12/1980 | Vinokurov et al. |
| 4,245,182 A | 1/1981 | Aotsu et al. |
| 4,246,694 A | 1/1981 | Raschbichler et al. |
| 4,255,684 A | 3/1981 | Mischler et al. |
| 4,258,280 A | 3/1981 | Starcevic |
| 4,262,209 A | 4/1981 | Berner |

| | | | | | | |
|---|---|---|---|---|---|---|
| 4,274,027 A | 6/1981 | Higuchi et al. | | 4,633,109 A | 12/1986 | Feigel |
| 4,281,264 A | 7/1981 | Keim et al. | | 4,650,924 A | 3/1987 | Kauffman et al. |
| 4,307,311 A | 12/1981 | Grozinger | | 4,652,963 A | 3/1987 | Fahlen |
| 4,308,476 A | 12/1981 | Schuler | | 4,656,379 A | 4/1987 | McCarty |
| 4,308,575 A | 12/1981 | Mase | | 4,677,328 A | 6/1987 | Kumakura |
| 4,310,966 A | 1/1982 | Breitenbach | | 4,687,882 A | 8/1987 | Stone et al. |
| 4,314,168 A | 2/1982 | Breitenbach | | 4,692,731 A | 9/1987 | Osinga |
| 4,317,001 A | 2/1982 | Silver et al. | | 4,723,083 A | 2/1988 | Elton |
| 4,320,645 A | 3/1982 | Stanley | | 4,723,104 A | 2/1988 | Rohatyn |
| 4,321,426 A | 3/1982 | Schaeffer et al. | | 4,724,345 A | 2/1988 | Elton et al. |
| 4,321,518 A | 3/1982 | Akamatsu | | 4,732,412 A | 3/1988 | van der Linden et al. |
| 4,330,726 A | 5/1982 | Albright et al. | | 4,737,704 A | 4/1988 | Kalinnikov et al. |
| 4,337,922 A | 7/1982 | Streiff et al. | | 4,745,314 A | 5/1988 | Nakano |
| 4,341,989 A | 7/1982 | Sandberg et al. | | 4,761,602 A | 8/1988 | Leibovich |
| 4,347,449 A | 8/1982 | Beau | | 4,766,365 A | 8/1988 | Bolduc et al. |
| 4,347,454 A | 8/1982 | Gellert et al. | | 4,771,168 A | 9/1988 | Gundersen et al. |
| 4,357,542 A | 11/1982 | Kirschbaum | | 4,785,138 A | 11/1988 | Brietenbach et al. |
| 4,360,748 A | 11/1982 | Raschbichler et al. | | 4,795,933 A | 1/1989 | Sakai |
| 4,361,723 A | 11/1982 | Hvizd, Jr. et al. | | 4,827,172 A | 5/1989 | Kobayashi |
| 4,363,612 A | 12/1982 | Walchhutter | | 4,845,308 A | 7/1989 | Womack, Jr. et al. |
| 4,365,178 A | 12/1982 | Lexz | | 4,847,747 A | 7/1989 | Abbondanti |
| 4,367,425 A | 1/1983 | Mendelsohn et al. | | 4,853,565 A * | 8/1989 | Elton et al. ............... 310/45 |
| 4,367,890 A | 1/1983 | Spirk | | 4,859,810 A | 8/1989 | Cloetens et al. |
| 4,368,418 A | 1/1983 | Demello et al. | | 4,859,989 A | 8/1989 | McPherson |
| 4,369,389 A | 1/1983 | Lambrecht | | 4,860,430 A | 8/1989 | Raschbichler et al. |
| 4,371,745 A | 2/1983 | Sakashita | | 4,864,266 A | 9/1989 | Feather et al. |
| 4,384,944 A | 5/1983 | Silver et al. | | 4,883,230 A | 11/1989 | Lindstrom |
| 4,387,316 A | 6/1983 | Katsekas | | 4,890,040 A | 12/1989 | Gundersen |
| 4,401,920 A | 8/1983 | Taylor et al. | | 4,894,284 A | 1/1990 | Yamanouchi et al. |
| 4,403,163 A | 9/1983 | Rarmerding et al. | | 4,914,386 A | 4/1990 | Zocholl |
| 4,404,486 A | 9/1983 | Keim et al. | | 4,918,347 A | 4/1990 | Takaba |
| 4,411,710 A | 10/1983 | Mochizuki et al. | | 4,918,835 A | 4/1990 | Raschbichler et al. |
| 4,421,284 A | 12/1983 | Pan | | 4,924,342 A | 5/1990 | Lee |
| 4,425,521 A | 1/1984 | Rosenberry, Jr. et al. | | 4,926,079 A | 5/1990 | Niemela et al. |
| 4,426,771 A | 1/1984 | Wang et al. | | 4,942,326 A | 7/1990 | Butler, III et al. |
| 4,429,244 A | 1/1984 | Nikitin et al. | | 4,949,001 A | 8/1990 | Campbell |
| 4,431,960 A | 2/1984 | Zucker | | 4,982,147 A | 1/1991 | Lauw |
| 4,432,029 A | 2/1984 | Lundqvist | | 4,994,952 A | 2/1991 | Silva et al. |
| 4,437,464 A | 3/1984 | Crow | | 4,997,995 A | 3/1991 | Simmons et al. |
| 4,443,725 A | 4/1984 | Derderian et al. | | 5,012,125 A | 4/1991 | Conway |
| 4,470,884 A | 9/1984 | Carr | | 5,030,813 A | 7/1991 | Stanisz |
| 4,473,765 A | 9/1984 | Butman, Jr. et al. | | 5,036,165 A | 7/1991 | Elton et al. |
| 4,475,075 A | 10/1984 | Munn | | 5,036,238 A | 7/1991 | Tajima |
| 4,477,690 A | 10/1984 | Nikitin et al. | | 5,066,881 A | 11/1991 | Elton et al. |
| 4,481,438 A | 11/1984 | Keim | | 5,067,046 A | 11/1991 | Elton et al. |
| 4,484,106 A | 11/1984 | Taylor et al. | | 5,083,360 A | 1/1992 | Valencic et al. |
| 4,488,079 A | 12/1984 | Dailey et al. | | 5,086,246 A | 2/1992 | Dymond et al. |
| 4,490,651 A | 12/1984 | Taylor et al. | | 5,091,609 A | 2/1992 | Sawada et al. |
| 4,503,284 A | 3/1985 | Minnick et al. | | 5,094,703 A * | 3/1992 | Takaoka et al. ............ 148/269 |
| 4,508,251 A | 4/1985 | Harada et al. | | 5,095,175 A | 3/1992 | Yoshida et al. |
| 4,510,077 A | 4/1985 | Elton | | 5,097,241 A | 3/1992 | Smith et al. |
| 4,517,471 A | 5/1985 | Sachs | | 5,097,591 A | 3/1992 | Wcislo et al. |
| 4,520,287 A | 5/1985 | Wang et al. | | 5,111,095 A | 5/1992 | Hendershot |
| 4,523,169 A * | 6/1985 | Hay ....................... 336/60 | | 5,124,607 A | 6/1992 | Rieber et al. |
| 4,523,249 A | 6/1985 | Arimoto | | 5,136,459 A | 8/1992 | Fararooy |
| 4,538,131 A | 8/1985 | Baier et al. | | 5,140,290 A | 8/1992 | Dersch |
| 4,546,210 A | 10/1985 | Akiba et al. | | 5,153,460 A | 10/1992 | Bovino et al. |
| 4,551,780 A | 11/1985 | Canay | | 5,168,662 A | 12/1992 | Nakamura et al. |
| 4,557,038 A | 12/1985 | Wcislo et al. | | 5,171,941 A | 12/1992 | Shimizu et al. |
| 4,560,896 A | 12/1985 | Vogt et al. | | 5,182,537 A | 1/1993 | Thuis |
| 4,565,929 A | 1/1986 | Baskin et al. | | 5,187,428 A | 2/1993 | Hutchison et al. |
| 4,571,453 A | 2/1986 | Takaoka et al. | | 5,231,249 A | 7/1993 | Kimura et al. |
| 4,588,916 A | 5/1986 | Lis | | 5,235,488 A | 8/1993 | Koch |
| 4,590,416 A | 5/1986 | Porche et al. | | 5,246,783 A | 9/1993 | Spenadel et al. |
| 4,594,630 A | 6/1986 | Rabinowitz et al. | | 5,264,778 A | 11/1993 | Kimmel et al. |
| 4,607,183 A | 8/1986 | Rieber et al. | | 5,287,262 A | 2/1994 | Klein |
| 4,615,109 A | 10/1986 | Wcislo et al. | | 5,304,883 A | 4/1994 | Denk |
| 4,615,778 A | 10/1986 | Elton | | 5,305,961 A | 4/1994 | Errard et al. |
| 4,618,795 A | 10/1986 | Cooper et al. | | 5,321,308 A | 6/1994 | Johncock |
| 4,619,040 A | 10/1986 | Wang et al. | | 5,323,330 A | 6/1994 | Asplund et al. |
| 4,622,116 A | 11/1986 | Elton et al. | | 5,325,008 A | 6/1994 | Grant |

| | | | | | | |
|---|---|---|---|---|---|---|
| 5,325,259 A | 6/1994 | Paulsson | | DE | 2400698 | 7/1975 |
| 5,327,637 A | 7/1994 | Britenbach et al. | | DE | 2520511 | 11/1976 |
| 5,341,281 A | 8/1994 | Skibinski | | DE | 2656389 | 6/1978 |
| 5,343,139 A | 8/1994 | Gyugyi et al. | | DE | 2721905 | 11/1978 |
| 5,355,046 A | 10/1994 | Weigelt | | DE | 137164 | 8/1979 |
| 5,365,132 A | 11/1994 | Hann et al. | | DE | 138840 | 11/1979 |
| 5,387,890 A | 2/1995 | Estop et al. | | DE | 2824951 | 12/1979 |
| 5,397,513 A | 3/1995 | Steketee, Jr. | | DE | 2835386 | 2/1980 |
| 5,399,941 A | 3/1995 | Grothaus et al. | | DE | 2839517 | 3/1980 |
| 5,400,005 A | 3/1995 | Bobry | | DE | 2854520 | 6/1980 |
| 5,408,169 A | 4/1995 | Jeanneret | | DE | 3009102 | 9/1980 |
| 5,449,861 A | 9/1995 | Fujino et al. | | DE | 2913697 | 10/1980 |
| 5,452,170 A | 9/1995 | Ohde et al. | | DE | 2920478 | 12/1980 |
| 5,455,551 A * | 10/1995 | Grimes et al. ............... 336/60 | | DE | 3028777 | 3/1981 |
| 5,468,916 A | 11/1995 | Litenas et al. | | DE | 2939004 | 4/1981 |
| 5,499,178 A | 3/1996 | Mohan | | DE | 3006382 | 8/1981 |
| 5,500,632 A | 3/1996 | Halser, III | | DE | 3008818 | 9/1981 |
| 5,510,942 A | 4/1996 | Bock et al. | | DE | 209313 | 4/1984 |
| 5,530,307 A | 6/1996 | Horst | | DE | 3305225 | 8/1984 |
| 5,533,658 A | 7/1996 | Benedict et al. | | DE | 3306418 | 8/1984 |
| 5,534,754 A | 7/1996 | Poumey | | DE | 3309051 | 9/1984 |
| 5,545,853 A | 8/1996 | Hildreth | | DE | 3441311 | 5/1986 |
| 5,550,410 A | 8/1996 | Titus | | DE | 3543106 | 6/1987 |
| 5,583,387 A | 12/1996 | Takeuchi et al. | | DE | 2917717 | 8/1987 |
| 5,587,126 A | 12/1996 | Steketee, Jr. | | DE | 3612112 | 10/1987 |
| 5,598,137 A | 1/1997 | Alber et al. | | DE | 3726390 | 2/1988 |
| 5,607,320 A | 3/1997 | Wright | | DE | 3807973 | 10/1988 |
| 5,612,510 A | 3/1997 | Hildreth | | DE | 3726346 | 2/1989 |
| 5,663,605 A | 9/1997 | Evans et al. | | DE | 3925337 | 2/1991 |
| 5,672,926 A | 9/1997 | Brandes et al. | | DE | 4023903 | 11/1991 |
| 5,689,223 A | 11/1997 | Demarmels et al. | | DE | 4022476 | 1/1992 |
| 5,807,447 A | 9/1998 | Forrest | | DE | 4233558 | 3/1994 |
| 5,834,699 A | 11/1998 | Buck et al. | | DE | 4402184 | 8/1995 |

FOREIGN PATENT DOCUMENTS

| | | | | | |
|---|---|---|---|---|---|
| CH | 539328 | 7/1973 | DE | 4412761 | 10/1995 |
| CH | SU 646403 | 2/1979 | DE | 4420322 | 12/1995 |
| CH | 657482 | 8/1986 | DE | 19620906 | 1/1996 |
| CH | SU 1189322 | 10/1986 | DE | 4438186 | 5/1996 |
| DE | 40414 | 8/1887 | DE | 19020222 | 3/1997 |
| DE | 277012 | 7/1914 | DE | 19547229 | 6/1997 |
| DE | 386561 | 12/1923 | DE | 468827 | 7/1997 |
| DE | 406371 | 11/1924 | DE | 134022 | 12/2001 |
| DE | 425551 | 2/1926 | EP | 049104 | 4/1982 |
| DE | 426793 | 2/1926 | EP | 0493704 | 4/1982 |
| DE | 432169 | 7/1926 | EP | 078908 | 5/1983 |
| DE | 433749 | 9/1926 | EP | 0120154 | 10/1984 |
| DE | 435608 | 10/1926 | EP | 0130124 | 1/1985 |
| DE | 435609 | 10/1926 | EP | 0142813 | 5/1985 |
| DE | 441717 | 3/1927 | EP | 0155405 | 9/1985 |
| DE | 443011 | 4/1927 | EP | 0102513 | 1/1986 |
| DE | 460124 | 5/1928 | EP | 0174783 | 3/1986 |
| DE | 482506 | 9/1929 | EP | 0185788 | 7/1986 |
| DE | 501181 | 7/1930 | EP | 0277358 | 8/1986 |
| DE | 523047 | 4/1931 | EP | 0234521 | 9/1987 |
| DE | 568508 | 1/1933 | EP | 0244069 | 11/1987 |
| DE | 572030 | 3/1933 | EP | 0246377 | 11/1987 |
| DE | 584639 | 9/1933 | EP | 0265868 | 5/1988 |
| DE | 586121 | 10/1933 | EP | 0274691 | 7/1988 |
| DE | 604972 | 11/1934 | EP | 0280759 | 9/1988 |
| DE | 629301 | 4/1936 | EP | 0282876 | 9/1988 |
| DE | 673545 | 3/1939 | EP | 0309096 | 3/1989 |
| DE | 719009 | 3/1942 | EP | 0314860 | 5/1989 |
| DE | 846583 | 8/1952 | EP | 0316911 | 5/1989 |
| DE | 875227 | 4/1953 | EP | 0317248 | 5/1989 |
| DE | 975999 | 1/1963 | EP | 0335430 | 10/1989 |
| DE | 1465719 | 5/1969 | EP | 0342554 | 11/1989 |
| DE | 1807391 | 5/1970 | EP | 0221404 | 5/1990 |
| DE | 2050674 | 5/1971 | EP | 0375101 | 6/1990 |
| DE | 1638176 | 6/1971 | EP | 0406437 | 1/1991 |
| DE | 2155371 | 5/1973 | EP | 0439410 | 7/1991 |
| | | | EP | 0440865 | 8/1991 |

| | | | | | | |
|---|---|---|---|---|---|---|
| EP | 0469155 A1 | 2/1992 | | GB | 1340983 | 12/1973 |
| EP | 0490705 | 6/1992 | | GB | 1341050 | 12/1973 |
| EP | 0503817 | 9/1992 | | GB | 1365191 | 8/1974 |
| EP | 0571155 | 11/1993 | | GB | 1395152 | 5/1975 |
| EP | 0620570 | 10/1994 | | GB | 1424982 | 2/1976 |
| EP | 0620630 | 10/1994 | | GB | 1426594 | 3/1976 |
| EP | 0642027 | 3/1995 | | GB | 1438610 | 6/1976 |
| EP | 0671632 | 9/1995 | | GB | 1445284 | 8/1976 |
| EP | 0676777 | 10/1995 | | GB | 1479904 | 7/1977 |
| EP | 0677915 | 10/1995 | | GB | 1483163 | 11/1977 |
| EP | 0684679 | 11/1995 | | GB | 1502938 | 3/1978 |
| EP | 0684682 | 11/1995 | | GB | 1525745 | 9/1978 |
| EP | 0732787 | 9/1996 | | GB | 2000625 | 1/1979 |
| EP | 0738034 | 10/1996 | | GB | 1548633 | 7/1979 |
| EP | 0739087 A2 | 10/1996 | | GB | 2046142 | 11/1979 |
| EP | 0740315 | 10/1996 | | GB | 2022327 | 12/1979 |
| EP | 0749190 A2 | 12/1996 | | GB | 2025150 | 1/1980 |
| EP | 0751605 | 1/1997 | | GB | 2034101 | 5/1980 |
| EP | 0739087 A3 | 3/1997 | | GB | 1574796 | 9/1980 |
| EP | 0749193 A3 | 3/1997 | | GB | 2070470 | 9/1981 |
| EP | 0780926 | 6/1997 | | GB | 2071433 | 9/1981 |
| EP | 0802542 | 10/1997 | | GB | 2081523 | 2/1982 |
| EP | 0695019 | 1/1998 | | GB | 2099635 | 12/1982 |
| EP | 0913912 A1 | 5/1999 | | GB | 2105925 | 3/1983 |
| FR | 805544 | 4/1936 | | GB | 2106306 | 4/1983 |
| FR | 841351 | 1/1938 | | GB | 2106721 | 4/1983 |
| FR | 847899 | 12/1938 | | GB | 2136214 | 9/1984 |
| FR | 916959 | 12/1946 | | GB | 2140195 | 11/1984 |
| FR | 1011924 | 4/1949 | | GB | 2150153 | 6/1985 |
| FR | 1126975 | 3/1955 | | GB | 2268337 | 1/1994 |
| FR | 1238795 | 7/1959 | | GB | 2273819 | 6/1994 |
| FR | 2108171 | 5/1972 | | GB | 2283133 | 4/1995 |
| FR | 2251938 | 6/1975 | | GB | 2289992 | 12/1995 |
| FR | 2305879 | 10/1976 | | GB | 2308490 | 6/1997 |
| FR | 2376542 | 7/1978 | | GB | 2332557 | 6/1999 |
| FR | 2467502 | 4/1981 | | HU | 175494 | 11/1981 |
| FR | 2481531 | 10/1981 | | JP | 60206121 | 3/1959 |
| FR | 2556146 | 6/1985 | | JP | 57043529 | 8/1980 |
| FR | 2954271 | 8/1987 | | JP | 57126117 | 5/1982 |
| FR | 2708157 | 1/1995 | | JP | 59076156 | 10/1982 |
| GB | 123906 | 3/1919 | | JP | 59159642 | 2/1983 |
| GB | 268271 | 3/1927 | | JP | 6264964 | 9/1985 |
| GB | 319313 | 7/1929 | | JP | 1129737 | 5/1989 |
| GB | 518993 | 3/1940 | | JP | 62320631 | 6/1989 |
| GB | 537609 | 6/1941 | | JP | 2017474 | 1/1990 |
| GB | 540456 | 10/1941 | | JP | 3245748 | 2/1990 |
| GB | 589071 | 6/1947 | | JP | 4179107 | 11/1990 |
| GB | 666883 | 2/1952 | | JP | 318253 | 1/1991 |
| GB | 685416 | 1/1953 | | JP | 424909 | 1/1992 |
| GB | 715226 | 9/1954 | | JP | 5290947 | 4/1992 |
| GB | 723457 | 2/1955 | | JP | 6196343 | 12/1992 |
| GB | 739962 | 11/1955 | | JP | 6233442 | 2/1993 |
| GB | 763761 | 12/1956 | | JP | 6325629 | 5/1993 |
| GB | 805721 | 12/1958 | | JP | 7057951 | 8/1993 |
| GB | 827600 | 2/1960 | | JP | 7264789 | 3/1994 |
| GB | 854728 | 11/1960 | | JP | 8167332 | 12/1994 |
| GB | 870583 | 6/1961 | | JP | 7161270 | 6/1995 |
| GB | 913386 | 12/1962 | | JP | 8264039 | 11/1995 |
| GB | 965741 | 8/1964 | | JP | 9200989 | 1/1996 |
| GB | 992249 | 5/1965 | | JP | 8036952 | 2/1996 |
| GB | 1024583 | 3/1966 | | JP | 8167360 | 6/1996 |
| GB | 1053337 | 12/1966 | | LU | 67199 | 3/1972 |
| GB | 1059123 | 2/1967 | | SE | 90308 | 9/1937 |
| GB | 1103098 | 2/1968 | | SE | 305899 | 11/1968 |
| GB | 1103099 | 2/1968 | | SE | 255156 | 2/1969 |
| GB | 1117401 | 6/1968 | | SE | 341428 | 12/1971 |
| GB | 1135242 | 12/1968 | | SE | 453236 | 1/1982 |
| GB | 1157885 | 7/1969 | | SE | 457792 | 6/1987 |
| GB | 1174659 | 12/1969 | | SE | 502417 | 12/1993 |
| GB | 1236082 | 6/1971 | | SU | 792302 | 1/1971 |
| GB | 1268770 | 3/1972 | | SU | 425268 | 9/1974 |

| | | |
|---|---|---|
| SU | 1019553 | 1/1980 |
| SU | 694939 | 1/1982 |
| SU | 955369 | 8/1983 |
| SU | 1511810 | 5/1987 |
| WO | WO8202617 | 8/1982 |
| WO | WO8502302 | 5/1985 |
| WO | WO9011389 | 10/1990 |
| WO | WO9012409 | 10/1990 |
| WO | PCT/DE 90/00279 | 11/1990 |
| WO | WO9101059 | 1/1991 |
| WO | WO9101585 | 2/1991 |
| WO | WO9107807 | 3/1991 |
| WO | PCT SE91/00077 | 4/1991 |
| WO | WO9109442 | 6/1991 |
| WO | WO 91/11841 | 8/1991 |
| WO | WO8115862 | 10/1991 |
| WO | WO 91/15755 | 10/1991 |
| WO | WO9201328 | 1/1992 |
| WO | WO9321681 | 10/1993 |
| WO | WO0406194 | 3/1994 |
| WO | WO9518058 | 7/1995 |
| WO | WO9522153 | 8/1995 |
| WO | WO9524049 | 9/1995 |
| WO | WO9622606 | 7/1996 |
| WO | PCT/CN 96/00010 | 10/1996 |
| WO | WO9630144 | 10/1996 |
| WO | WO9710640 | 3/1997 |
| WO | WO9711831 | 4/1997 |
| WO | WO9716881 | 5/1997 |
| WO | WO 97/45908 | 5/1997 |
| WO | WO 97/29494 | 8/1997 |
| WO | WO9745288 | 12/1997 |
| WO | WO9745847 | 12/1997 |
| WO | PCT/FR 98/00468 | 6/1998 |
| WO | WO9834244 | 8/1998 |
| WO | WO9834245 | 8/1998 |
| WO | WO9834246 | 8/1998 |
| WO | WO9834247 | 8/1998 |
| WO | WO9834248 | 8/1998 |
| WO | WO9834249 | 8/1998 |
| WO | WO9834250 | 8/1998 |
| WO | WO9834309 | 8/1998 |
| WO | WO9834312 | 8/1998 |
| WO | WO9834315 | 8/1998 |
| WO | WO9834321 | 8/1998 |
| WO | WO9834322 | 8/1998 |
| WO | WO9834323 | 8/1998 |
| WO | WO9834325 | 8/1998 |
| WO | WO9834326 | 8/1998 |
| WO | WO9834327 | 8/1998 |
| WO | WO9834328 | 8/1998 |
| WO | WO9834329 | 8/1998 |
| WO | WO9834330 | 8/1998 |
| WO | WO9834331 | 8/1998 |
| WO | WO 98/40627 | 9/1998 |
| WO | WO 98/43336 | 10/1998 |
| WO | WO9917309 | 4/1999 |
| WO | WO9917311 | 4/1999 |
| WO | WO9917312 | 4/1999 |
| WO | WO9917313 | 4/1999 |
| WO | WO9917314 | 4/1999 |
| WO | WO9917315 | 4/1999 |
| WO | WO9917316 | 4/1999 |
| WO | WO9917422 | 4/1999 |
| WO | WO9917424 | 4/1999 |
| WO | WO9917425 | 4/1999 |
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO9929024 | 6/1999 |
| WO | WO9929026 | 6/1999 |
| WO | WO9929029 | 6/1999 |
| WO | WO9929034 | 6/1999 |

OTHER PUBLICATIONS

Analysis of faulted Power Systems; P Anderson, Iowa State University Press / Ames, Iowa, 1973, pp 255–257, no month.

36–Kv. Generators Arise from Insulation Research; P. Sidler; *Electrical World* Oct. 15, 1932, ppp 524.

Oil Water cooled 300 MW turbine generator;L.P. Gnedin et al; *Elektrotechnika*, 1970, pp 6–8, no month.

J&P Transformer Book 11$^{th}$ Edition;A. C. Franklin et al; owned by Butterworth—Heinemann Ltd, Oxford Printed by Hartnolls Ltd in Great Britain 1983, pp29–67, no month.

Transformerboard; H.P. Moser et al; 1979, pp 1–19, no month.

The Skagerrak transmission—the world's longest HVDC submarine cable link; L. Haglof et al of ASEA; ASEA Journal vol. 53, No. 1–2, 1980, pp 3–12, no month.

Direct Connection of Generators to HVDC Converters: Main Characteristics and Comparative Advantages; J.Arrillaga et al; *Electra* No. 149, Aug. 1993, pp 19–37.

Our flexible friend article; M. Judge; *New Scientist,* May 10, 1997, pp 44–48.

In–Service Performance of HVDC Converter transformers and oil–cooled smoothing reactors; G.L. Desilets et al; *Electra* No. 155, Aug. 1994, pp 7–29.

Transformateurs a courant continu haute tension–examen des specifications; A. Lindroth et al; *Electra* No 141, Apr. 1992, pp 34–39.

Development of a Termination for the 77 kV–Class High Tc Superconducting Power Cable; T. Shimonosono et al; IEEE Power Delivery, vol. 12, No. 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–542.

A High Initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol. 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D.W.Scherbarth et al; IEEE Applied Superconductivity, vol. 7, No. 2, Jun. 1997, pp 840–843.

High Speed Synchronous Motors Adjustable Speed Drives; ASEA Generation Pamphlet OG 135–101 E, Jan. 1985, pp 1–4.

400–kV XLPE cable system passes CIGRE test; ABB Article; ABB Review Sep. 1995, pp 38.

FREQSYN—a new drive system for high power applications; J–A. Bergman et al; ASEA Journal 59, Apr. 1986, pp16–19.

Canadians Create Conductive Concrete; J. Beaudoin et al; *Science,* vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; *Transmission & Distribution,* Dec. 1996, pp 49–54.

Investigation and Use of Asynchronized Machines in Power Systems*; N.I.Blotskii et al; *Elektrichestvo,* No. 12, 1–6, 1985, pp 90–99, no month.

Variable–speed switched reluctance motors; P.J. Lawrenson et al; IEE proc, vol. 127, Pt.B, No. 4, Jul. 1980, pp 253–265.

Das Einphasenwechselstromsystem hoherer Frequenz; J.G. Heft; Elektrische Bahnen eb; Dec. 1987, pp 388–389.

Power Transmission by Direct Current;E. Uhlmann;ISBN 3–540–07122–9 Springer–Verlag, Berlin/Heidelberg/New York; 1975, pp 327–328, no month.

Elektriska Maskiner; F. Gustavson; Institute for Elkreafteknilk, KTH; Stockholm, 1996, pp 3–6—3–12, no month.

Die Wecheselstromtechnik; A. Cour'Springer Verlag, Germany; 1936, pp 586–598, no month.

Insulation systems for superconducting transmission cables; O.Toennesen; Nordic Insulation Symposium, Bergen, 1996, pp 425–432, no month.

MPTC: An economical alternative to universal power flow controllers; N. Mohan; EPE 1997, Trondheim, pp 3.1027–3.1030, no month.

Lexikon der Technik; Luger; Band 2, Grundlagen der Elektrotechnik und Kerntechnik, 1960, pp 395, no month.

Das Handbuch der Lokomotiven ( hungarian locomotive V40 1'D'); B. Hollingsworth et al; Pawlak Verlagsgesellschaft; 1933, pp. 254–255, no month.

Synchronous machines with single or double 3–phase star–connected winding fed by 1 2–pulse load commutated inverter. Simulation of operational behaviour; C. Ivarson et al; ICEM 1994, International Conference on electrical machines, vol. 1, pp 267–272, no month.

Elkrafthandboken, Elmaskiner; A. Rejminger; Elkrafthandboken, Elmaskiner 1996, 15–20, no month.

Power Electronics—in Theory and Practice; K. Thorborg; ISBN 0–86238–341–2, 1993, pp 1–13, no month.

Regulating transformers in power systems– new concepts and applications; E. Wirth et al; ABB Review Apr. 1997, p 12–20.

Transforming transformers; S. Mehta et al; *IEEE Spectrum,* Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Krueger; *Industrial High Voltage* 1991 vol. 1, pp. 113–117, no month.

High Voltage Engineering; N.S. Naidu; High Voltage Engineering ,second edition 1995 ISBN 0–07–462286–2, Chapter 5, pp91–98, no month.

Performance Characteristics of a Wide Range Induction Type Frequency Converter; G.A. Ghoneem; Ieema Journal, Sep. 1995, pp 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp 1–65, no month.

Design and manufacture of a large superconducting homopolar motor; A.D. Appleton; IEEE Transactions on Magnetics, vol. 19,No. 3, Part 2, May 1983, pp 1048–1050.

Application of high temperature superconductivity to electric motor design; J.S. Edmonds et al; IEEE Transactions on Energy Conversion Jun. 1992, No. 2, pp 322–329.

Power Electronics and Variable Frequency Drives; B. Bimal; IEEE industrial Electronics—Technology and Applications, 1996, pp. 356, no month.

Properties of High Plymer Cement Mortar; M. Tamai et al; *Science & Technology in Japan* No 63; 1977, pp 6–14, no month.

Weatherability of Polymer–Modified Mortars after Ten–Year Outdoor Exposure in Koriyama and Sapporo; Y. Ohama et al; *Science & Technology in Japan* No. 63; 1977, pp 26–31, no month.

SMC Powders Open New Magnetic Applications; M. Persson (Editor); *SMC Update* ,vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No 6, Mar. 15, 1988, p. 1882–1888.

Low–intensy laser–triggering of rail–gaps with magnesium–aerosol switching–gases; W. Frey; 11th International Pulse Power Conference, 1997, Baltimore, USA Digest of Technical Papers, p. 322–327, no month.

High Voltage Cables in a New Class of Generators Powerformer; M. Leijon et al; Jun. 14, 1999; pp1–8.

Ohne Tranformator direkt ins Netz; Owman et al, ABB, AB; Feb. 8, 1999; pp48–51.

Submersible Motors and Wet–Rotor Motors for Centrifugal Pumps Submerged in the Fluid Handled; K.. Bienick, KSB; pp9–17.

High Voltage Generators; G. Beschastnov et al; 1977; vol. 48. No. 6 pp1–7.

Eine neue Type von Unterwassermotoren; Electrotechnik und Maschinenbam, 49; Aug. 1931; pp2–3.

Problems in design of the 110–5OokV high–voltage generators; Nikiti et al; World Electrotechnical Congress; Jun. 21–27, 1977; Section 1. Paper #18.

Hydroalternators of 110 to 220 kV Elektrotechn. Obz., vol. 64, No. 3, pp132–136 Mar. 1975; A. Abramov.

Design Concepts for an Amorphous Metal Distribution Transformer; E. Boyd et al; IEEE Nov. 1984.

Zur Geschichte der Brown Boveri–Synchron–Maschinen; Vierzig Jahre Generatorbau; Jan.–Feb. 1931 pp15–39.

High capacity synchronous generator having no tooth stator; V.S. Kildishev et al; No. 1, 1977, pp11–16, no month.

Der Asynchronmotor als Antrieb stopfbcichsloser Pumpen; E. Picmaus; Elektrotechnik und Maschinenbay No. 78, pp153–155, 1961, no month.

Low core loss rotating flux transformer; R. F. Krause, et al; American Institute Physics J. Appl.Phys vol. 64 #10 Nov. 1988, pp5376–5378, no date.

Hochspannungsanlagen for Wechselstrom; 97. Hochspannungsaufgaben an Generatoren und Motoren; Roth et al; Spring 1959, pp30–33, no month.

Neue Lbsungswege zum Entwurf grosser Turbogeneratoren bis 2GVA, 6OkV; G. Aicholzer; Sep. 1974, pp249–255, no date.

Advanced Turbine–generators– an assessment; A. Appleton, et al; International Conf. Proceedings, Lg–HV Elec. Sys. Paris, FR, Aug.–Sep. 1976, vol I, Section 11–02, p. 1–9.

Fully slotless turbogenerators; E. Spooner; Proc., IEEE vol. 120 #12, Dec. 1973.

High–Voltage Stator Winding Development; D. Albright et al; Proj. Report EL339, Project 1716, Apr. 1984, no date.

POWERFORMER™: A giant step in power plant engineering; Owman et al; CIGRE 1998, Paper 11:1.1, no month.

Transformer core losses; B. Richardson; Proc. IEEE May 1986, pp365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996, no month.

M. Ichihara and F. Fukasawa, "An EHV Bulk Power Transmission Line Made with Low Loss XLPE Cable," Aug. 1992, *Hitachi Cable Review*, No. 11, pp. 3–6, no date.

*Underground Transmission Systems Reference Book,* 1992 Edition, prepared by Power Technologies, Inc. for Electric Power Research Institute (title page), no month.

R. F. Schiferl and C. M. Ong, "Six Phase Synchronous Machine with AC and DC Stator Connections, Part II: Harmonic Studies and a Proposed Uninterruptible Power Supply Scheme", *IEEE Transactions on Power Apparatus and Systems,* vol. PAS–102, No. 8, Aug. 1983, pp. 2694–2701, no date.

R. F. Schiferl and C. M. Ong, "Six–Phase Synchronous Machine with AC and DC Stator Connections, Part I: Equivalent Circuit Representation and Steady–State Analysis", *IEEE Transactions on Power Apparatus and Systems*, vol. PAS–102, No. 8, Aug. 1983, pp. 2685–2693, no date.

T. Petersson, *Reactive Power Compensation,* Abb Power Systems AB, Dec. 1993, no date.

"Different types of Permanent Magnet Rotors", a summary by ABB Corporate Research, Nov. 1997, no date.

K. Binns, Permanent Magnet Machines, *Handbook of Electric Machines,* Chapter 9, McGraw Hill, 1987, pp. 9–1–9–25, no month.

* cited by examiner

TRANSFORMER/REACTOR

TECHNICAL FIELD

The present invention relates to a power transformer/reactor.

For all transmission and distribution of electric energy, transformers are used and their task is to allow exchange of electric energy between two or more electric systems. A transformer is a classical electrical product which has existed, both theoretically and practically, for more than 100 years. This is manifestly clear from the German patent specification DE 40414 from 1885. Transformers are available in all power ranges from the VA up to the 1000 MVA range.

With respect to the voltage range, there is a spectrum up to the highest transmission voltages which are being used today.

A transformer belongs to an electrical product group which, regarding the fundamental mode of operation, is relatively easy to understand. For the energy transfer between the electric systems, electromagnetic induction is utilized. There are a great number of textbooks and articles which more or less theoretically and practically describe the theory, calculations, manufacture, use, service life, etc., of the transformer. In addition, there are a large number of patent documents relating to successively improved embodiments of the different parts of a transformer, such as, for example, windings, core, tank, accessories, cooling, etc.

The invention relates to a transformer belonging to the so-called power transformers with a rated power ranging from a few hundred kVA up to more than 1000 MVA with a rated voltage ranging from 3–4 kV and up to very high transmission voltages, 400 kV to 800 kV or higher.

The inventive concept which is the basis of the present invention is also applicable to reactors. The following description of the background art, however, mainly relates to power transformers. As is well-known, reactors may be designed as single-phase and three-phase reactors. As regards insulation and cooling there are, in principle, the same embodiments as for transformers. Thus, air-insulated and oil-insulated, self-cooled, oil cooled, etc., reactors are available. Although reactors have one winding (per phase) and may be designed both with and without an iron core, the description of the background art is to a large extent relevant to reactors.

BACKGROUND ART, THE PROBLEMS

In order to place a power transformer/reactor according to the invention in its proper context and hence be able to describe a new approach in accordance with the invention in addition to the advantages afforded by the invention with respect to the prior art, a relatively complete description of a power transformer as it is currently designed will first be given below as well in addition to the limitations and problems which exist when it comes to calculations, design, insulation, earthing, manufacture, use, testing, transport, etc., of these transformers.

With respect to the above-mentioned, there is a comprehensive literature describing transformers in general, and more particularly, power transformers. Reference may be made, for example, to the following:

*The J & P Transformer Book, A Practical Technology of the Power Transformer*, by A. C. Franklin and D. P. Franklin, published by Butterworths, edition 11, 1990.

Regarding the internal electrical insulation of windings, etc., the following can be mentioned: *Transformerboard, Die Verwendung von Transformerboard in Grossleistungstransformatoren* by H. P. Moser, published by H. Weidman AG, CH-8640 Rapperswil.

From a purely general point of view, the primary task of a power transformer is to allow exchange of electric energy between two or more electrical systems of, usually, different voltages with the same frequency.

A conventional power transformer comprises a transformer core, in the following referred to as a core, often of laminated oriented sheet, usually of silicon steel. The core comprises a number of core limbs, connected by yokes which together form one or more core windows. Transformers with such a core are often referred to as core transformers. Around the core limbs there are a number of windings which are normally referred to as primary, secondary and control windings. As far as power transformers are concerned, these windings are practically always concentrically arranged and distributed along the length of the core limbs. The core transformer usually has circular coils as well as a tapering core limb section in order to fill up the window as effectively as possible.

In addition to the core type transformer there is so-called shell-type transformer. These are often designed with rectangular coils and a rectangular core limb section.

Conventional power transformers, in the lower end of the above-mentioned power range, are sometimes designed with air cooling to dissipate the heat from inherent losses. For protection against contact, and for possibly reducing the external magnetic field of the transformer, it is often provided with an outer casing provided with ventilation openings.

Most of the conventional power transformers, however, are oil-cooled. One of the reasons for this is that the oil has an additional very important function as insulating medium. An oil-cooled and oil-insulated power transformer is therefore surrounded by an external tank on which, as will be clear from the description below, very high demands are placed.

Usually, means for water-cooling of the oil are provided.

The following part of the description will for the most part refer to oil-filled power transformers.

The windings of the transformer are formed from one or several coils connected in series built up of a number of turns connected in series. In addition, the coils are provided with a special device to allow switching between the taps of the coils. Such a device may be designed for tapping with the aid of screw joints or more often with the aid of a special switch which is operable in the vicinity of the tank. In the event that switching can take place for a transformer under voltage, the changeover switch is referred to as an on-load tap changer whereas otherwise it is referred to as a deenergized tap changer.

Regarding oil-cooled and oil-insulated power transformers in the upper power range, the contacts of the on-load tap changers are placed in special oil-filled containers with direct connection to the transformer tank. The contacts are operated purely mechanically via a motor-driven rotating shaft and are arranged so as to obtain a fast movement during the switching when the contact is open and a slower movement when the contact is to be closed. The on-load tap changers as such, however, are placed in the actual transformer tank. During the operation, arcing and sparking occur. This leads to degradation of the oil in the containers. To obtain less arcs and hence also less formation of soot and less wear on the contacts, the on-load tap changers are usually connected to the high-voltage side of the transformer. This is due to the fact that the currents which need to be broken and connected, respectively, are smaller on the high-voltage side than if the on-load tap changers were to be connected to the low-voltage side. Failure statistics of conventional oil-filled power transformers show that it is often the on-load tap changers which give rise to faults.

In the lower power range of oil-cooled and oil-insulated power transformers, both the on-load tap changers and their contacts are placed inside the tank. This means that the above-mentioned problems with respect to degradation of the oil because of arcing during operation, etc., affect the whole oil system.

From the point of view of applied or induced voltage, it can broadly be said that a voltage which is stationary across a winding is distributed equally onto each turn of the winding, i.e., the turn voltage is equal on all the turns.

From the point of view of electric potential, however, the situation is completely different. One end of a winding is usually connected to earth. This means, however, that the electric potential of each turn increases linearly from practically zero in the turn which is nearest the earth potential up to a potential in the turns which are at the other end of the winding which correspond to the applied voltage.

This potential distribution determines the composition of the insulation system since it is necessary to have sufficient insulation both between adjacent turns of the winding and between each turn and earth.

The turns in an individual coil are normally brought together into a geometrical coherent unit, physically delimited from the other coils. The distance between the coils is also determined by the dielectric stress which may be allowed to occur between the coils. This thus means that a certain given insulation distance is also required between the coils. According to the above, sufficient insulation distances are also required to the other electrically conducting objects which are within the electric field from the electric potential locally occurring in the coils.

It is thus clear from the above-mentioned description that for the individual coils, the voltage difference internally between physically adjacent conductor elements is relatively low whereas the voltage difference externally in relation to other metal objects—the other coils being included—may be relatively high. The voltage difference is determined by the voltage induced by magnetic induction as well as by the capacitively distributed voltages which may arise from a connected external electrical system on the external connections of the transformer. The voltage types which may enter externally comprise, in addition to operating voltage, lightning overvoltages and switching overvoltages.

In the current conductors of the coils, additional losses arise as a result of the magnetic leakage field around the conductor. To keep these losses as low as possible, especially for power transformers in the upper power range, the conductors are normally divided into a number of conductor elements, often referred to as strands, which are connected in parallel during operation. These strands must be transposed according to such a pattern that the induced voltage in each strand becomes as equal as possible and so that the difference in induced voltage between each pair of strands becomes as small as possible for internally circulating current components to be kept down at a reasonable level from the loss point of view.

When designing transformers according to the prior art, the general aim is to have as large a quantity of conductor material as possible within a given area limited by the so-called transformer window, generally described as having as high a fill factor as possible. The available space shall comprise, in addition to the conductor material, also the insulating material associated with the coils, partly internally between the coils and partly to other metallic components including the magnetic core.

The insulation system, partly within a coil/winding and partly between coils/windings and other metal parts, is normally designed as a solid cellulose- or varnish-based insulation nearest the individual conductor element, and outside of this as solid cellulose and liquid, possibly also gaseous, insulation. In this way, windings with insulation and possible support parts represent large volumes which will be subjected to high electric field strengths which arise in and around the active electromagnetic parts of the transformer. In order to predetermine the dielectric stresses which arise and achieve a dimensioning with a minimum risk of breakdown, good knowledge of the properties of insulating materials is required. It is also important to achieve such a surrounding environment that it does not change or reduce the insulating properties.

The currently predominant insulation system for high-voltage power transformers comprises cellulose material as the solid insulation and transformer oil as the liquid insulation. The transformer oil is based on so-called mineral oil.

The transformer oil has a dual function since, in addition to the insulating function, it actively contributes to cooling of the core, the winding, etc., by removal of the loss heat of the transformer. Oil cooling requires an oil pump, an external cooling element, an expansion vessel, etc.

The electrical connection between the external connections of the transformer and the immediately connected coils/windings is referred to as a bushing aiming at a conductive connection through the wall of the tank which, in the case of oil-filled power transformers, surrounds the actual transformer. The bushing is often a separate component fixed to the tank wall and is designed to withstand the insulation requirements being made, both on the outside and the inside of the tank, while at the same time it should withstand the current loads occurring and the resulting current forces.

It should be pointed out that the same requirements for the insulation system as described above regarding the windings also apply to the necessary internal connections between the coils, between bushings and coils, different types of switches and the bushings as such.

All the metallic components inside a power transformer are normally connected to a given earth potential with the exception of the current-carrying conductors. In this way, the risk of an unwanted, and difficult-to-control, potential increase as a result of capacitive voltage distribution between current leads at high potential and earth is avoided. Such an unwanted potential increase may give rise to partial discharges, so-called corona, which may be revealed during the normal acceptance tests, which partially are performed, compared with rated data, increased voltage and frequency. Corona may give rise to damage during operation.

The individual coils in a transformer must have such a mechanical dimensioning that they may withstand any stresses occurring as a consequence of currents arising and the resulting current forces during a short-circuit process. Normally, the coils are designed in such a way that the forces arising are absorbed within each individual coil, which in turn may mean that the coil cannot be dimensioned optimally for its normal function during normal operation.

Within a narrow voltage and power range of oil-filled power transformers, the windings are designed as so-called helical windings. This implies that the individual conductors mentioned above are replaced by thin sheets. Helical-wound power transformers are manufactured for voltages of up to 20–30 kV and powers of up to 20–30 MW.

The insulation system of power transformers within the upper power range requires, in addition to a relatively complicated design, also special manufacturing measures to utilize the properties of the insulation system in the best possible way. In order to obtain a good insulation to be obtained, the insulation system shall have a low moisture content, the solid part of the insulation shall be well impregnated with the surrounding oil and the risk of remaining "gas" pockets in the solid part must be minimal. To ensure this, a special drying and impregnating process is carried out on a complete core with windings before it is lowered into a tank. After this drying and impregnating process, the transformer is lowered into the tank which is then sealed. Before filling of oil, the tank with the immersed transformer must be emptied of all its air. This is done in connection with a special vacuum treatment. After carrying this out the tank is filled with oil.

In order to obtain the promised service life, etc., almost absolute vacuum is required during the vacuum treatment. This thus presupposes that the tank which surrounds the transformer is designed for full vacuum, which entails a considerable consumption of material and manufacturing time.

If electric discharges occur in an oil-filled power transformer, or if a local considerable increase of the temperature in any part of the transformer occurs, the oil disintegrates and gaseous products dissolve in the oil. The transformers are therefore usually provided with monitoring devices for detection of gas dissolved in the oil.

For weight reasons large power transformers are transported without oil. On-site installation of the transformer at the customer requires, in turn, renewed vacuum treatment. In addition, this is a process which, furthermore, has to be repeated each time the tank is opened for some repair work or inspection.

It is obvious that these processes are very time-consuming and cost-demanding and constitute a considerable part of the total time for manufacture and repair while at the same time requiring access to extensive resources.

The insulating material in conventional power transformers constitutes a large part of the total volume of the transformer. For a power transformer in the upper power range, oil quantities in the order of several tens of cubic meters of transformer oil are not unusual. The oil which exhibits a certain similarity to diesel oil is thinly fluid and exhibits a relatively low flash point. It is thus obvious that oil together with the cellulose constitutes a non-negligible fire hazard in the case of unintentional heating, for example at an internal flashover and a resulting oil spillage.

It is also obvious that, especially in oil-filled power transformers, there is a very large transport problem. Such a power transformer in the upper power range may have a total oil volume of several decades of cubic meters and may have a weight of up to several hundred tons. It is realized that the external design of the transformer must sometimes be adapted to the current transport profile, i.e., for any passage of bridges, tunnels, etc.

A short summary of the prior art with respect to oil-filled power transformers follows hereafter in which both its limitations and problem areas will be described:

An oil-filled conventional power transformer comprises an outer tank which is to house a transformer comprising a transformer core with coils, oil for insulation and cooling, mechanical support devices of various kinds, etc. Very large mechanical demands are placed on the tank, since, without oil but with a transformer, it shall be capable of being vacuum-treated to practically full vacuum. The tank requires very extensive manufacturing and testing processes and the large external dimensions of the tank also normally entail considerable transport problems;

normally comprises a so-called pressure-oil cooling. This cooling method requires the provision of an oil pump, an external cooling element, an expansion vessel and an expansion coupling, etc.;

comprises an electrical connection between the external connections of the transformer and the immediately connected coils/windings in the form of a bushing fixed to the tank wall. The bushing is designed to withstand any insulation requirements made, both regarding the outside and the inside of the tank;

comprises coils/windings whose conductors are divided into a number of conductor elements, strands, which have to be transposed in such a way that the voltage induced in each strand becomes as equal as possible and such that the difference in induced voltage between each pair of strands becomes as small as possible;

comprises an insulation system, partly within a coil/winding and partly between coils/windings and other metal parts which is designed as a solid cellulose- or varnish-based insulation nearest the individual conductor element and, outside of this, solid cellulose and a liquid, possibly also gaseous, insulation. In addition, it is extremely important that the insulation system exhibits a very low moisture content;

comprises as an integrated part an on-load tap changer, surrounded by oil and normally connected to the high-voltage winding of the transformer for voltage control;

comprises oil which may entail a non-negligible fire hazard in connection with internal partial discharges, so-called corona, sparking in on-load tap changers and other fault conditions;

comprises normally a monitoring device for monitoring gas dissolved in the oil, which occurs in case of electrical discharges therein or in case of local increases of the temperature;

comprises oil which, in the event of damage or accident, may result in oil spillage leading to extensive environmental damage.

SUMMARY OF THE INVENTION, ADVANTAGES

The object of the invention is to offer a transformer concept within the power range which has been described under the description of the background art, that is, so-called power transformers with a rated power ranging from a few hundred kVA up to over 1000 MVA with a rated voltage ranging from 3–4 kV and up to very high transmission voltages, such as 400 kv to 800 kV or higher, and which does not entail the disadvantages, problems and limitations which are associated with the prior art oil-filled power transformers according to what is clear from the above-mentioned description of the prior art. The invention is based on the realization that, by designing the winding or the windings in the transformer/reactor so that it comprises a solid insulation surrounded by an outer and an inner potential-equalizing semiconducting layer, within which inner layer the electric conductor is located, a possibility is provided of maintaining the electric field in the whole plant within the winding. The electric conductor must, according to the invention, be so arranged that it has such a conducting contact with the inner semiconducting layer that no harmful potential differences may arise in the boundary layer between the innermost part of the solid insulation and the surrounding inner semiconductor along the length of the conductor. A power transformer according to the invention exhibits obvious considerable advantages in relation to a conventional oil-filled power transformer. The advantages will be described in more detail below. As mentioned in the introductory part of the description, the invention also provides for the concept to be applied to reactors both with and without an iron core.

The essential difference between conventional oil-filled power transformers/reactors and a power transformer/reactor according to the invention is that the winding/windings thus comprise a solid insulation surrounded by an external and an internal potential layer as well as at least one electric conductor arranged inside the internal potential layer, designed as semiconductors. A definition of what is comprised by the concept semiconductor will be described below. According to a preferred embodiment, the winding/windings is/are designed in the form of a flexible cable.

At the high voltage levels which are required in a power transformer/reactor according to the invention, which is connected to high-voltage networks with very high operating voltages, the electric and thermal loads which may arise will impose extreme demands on the insulating material. It is known that so-called partial discharges, PD, generally constitute a serious problem for the insulating material in high-voltage installations. If cavities, pores or the like arise at an insulating layer, internal corona discharge may arise at high electric voltages, whereby the insulating material is gradually degraded and which finally may lead to electric breakdown through the insulation. It is realized that this may lead to serious breakdown of, for example, a power transformer.

The invention is, inter alia, based on the realization that the semiconducting potential layers exhibit similar thermal properties as regards the coefficient of thermal expansion and that the layers are secured to the solid insulation. Preferably, the semiconducting layers according to the invention are integrated with the solid insulation to ensure that these layers and the adjoining insulation exhibit similar thermal properties to ensure good contact independently of the variations in temperature which arise in the line at different loads. At temperature gradients the insulating part with semiconducting layers will constitute a monolithic part and defects caused by different temperature expansion in the insulation and the surrounding layers do not arise. The electric load on the material is reduced as a consequence of the fact that the semiconducting parts around the insulation will constitute equipotential surfaces and that the electric field in the insulating part will hence be distributed nearly uniformly over the thickness of the insulation.

According to the invention, it must be ensured that the insulation is not broken down by the phenomena described above. This can be achieved by using as insulation layers, manufactured in such a way that the risk of cavities and pores is minimal, for example extruded layers of a suitable thermoplastic material, such as crosslinked PE (polyethylene), XLPE and EPR (ethylene-propylene rubber). The insulating material is thus a low-loss material with high breakdown strength, which exhibits shrinkage when being loaded.

The electric load on the material is reduced as a consequence of the fact that the semiconducting parts around the insulation will constitute equipotential surfaces and that the electric field in the insulating part will hence be distributed nearly uniformly over the thickness of the insulation.

It is known, per se, in connection with transmission cables for high-voltage and for transmission of electric energy, to design conductors with an extruded insulation, based on the premise that the insulation should be free from defects. In these transmission cables, the potential lies, in principle, at the same level along the whole length of the cable, which provides a high electric stress in the insulating material. The transmission cable is provided with one inner and one outer semiconducting layer for potential equalization.

The present invention is thus based on the realization that, by designing the winding according to the characteristic features described in the claims as regards the solid insulation and the surrounding potential-equalizing layers, a transformer/reactor can be obtained in which the electric field is kept within the winding. Additional improvements may also be achieved by constructing the conductor from smaller insulated parts, so-called strands. By making these strands small and circular, the magnetic field across the strands will exhibit a constant geometry in relation to the field and the occurrence of eddy currents will be minimized.

Figure 2:
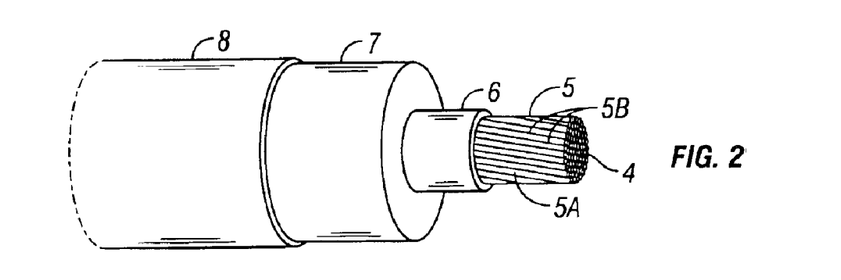
FIG. 2 shows an embodiment of a winding in the form of a cable in power transformers/reactors according to the invention.

According to the invention, the winding windings is are thus preferably made in the form of a flexible cable (as shown in FIG. 2) comprising at least one conductor comprising a number of strands 5, including insulated strands 5A and uninsulated strands 5B, and with an inner semiconducting layer 6 around the strands 5. Outside of this inner semiconducting layer 6 is the main insulation of the cable in the form of a solid insulation 7, and around this solid insulation is an outer semiconducting layer 8. The cable may in certain contexts have additional outer layers.

According to the invention, the outer semiconducting layer shall exhibit such electrical properties that a potential equalization along the conductor is ensured. The semconducting layer must not, however, exhibit such conductivity properties that the induced current causes an unwanted thermal load. Further, the conductor properties of the layer must be sufficient to ensure that an equipotential surface is obtained. The resistivity, ρ, of the semiconducting layer shall exhibit a minimum value, $\rho_{min}$=1 Ωcm, and a maximum value, $\Omega_{max}$=100 kΩcm, and, in addition, the resistance of the semiconducting layer per unit of length in the axial extent, R, of the cable shall exhibit a minimum value $R_{min}$=50 Ω/m and a maximum value $R_{max}$50 MΩ/m.

The inner semiconducting layer must exhibit sufficient electrical conductivity in order for it to function in a potential-equalizing manner and hence equalizing with respect to the electric field outside the inner layer. In this connection it is important that the layer has such properties that it equalizes any irregularities in the surface of the conductor and that it forms an equipotential surface with a high surface finish at the boundary layer with the solid insulation. The layer may, as such, be formed with a varying thickness but to ensure an even surface with respect to the conductor and the solid insulation, its thickness is suitably between 0.5 and 1 mm. However, the layer must not exhibit such a great conductivity that it contributes to induce voltages. For the inner semiconducting layer, thus, $\tau_{min}$= $10^{-6}$ Ωcm, $R_{min}$=50 μΩ/m and, in a corresponding way, $\tau_{max}$=100 kΩcm, $R_{max}$=5 MΩ/m.

Such a cable which is used according to the invention is an improvement of a thermoplastic cable and/or a cross linked thermoplastic such as XLPE or a cable with ethylene propylene (EP) rubber insulation or other rubber, for example silicone. The improvement comprises, inter alia, a new design both as regards the strands of the conductors and in that the cable has no outer casing for mechanical protection of the cable.

A winding comprising such a cable will entail quite different conditions from the insulation point of view from those which apply to conventional transformers/reactor windings due to the electric field distribution. To utilize the advantages afforded by the use of the mentioned cable, there are other possible embodiments as regards earthing of a transformer/reactor according to the invention than what apply to conventional oil-filled power transformers.

It is essential and necessary for a winding in a power transformer/reactor according to the invention that at least one of the strands of the conductor 5 is uninsulated and arranged such that it has good electrical contact with the inner semiconducting layer 6. The inner layer will thus always remain at the potential of the conductor. Alternatively, different strands may be alternately conducting with electrical contact with the inner semiconducting layer.

As far as the rest of the strands 5A are concerned, all of them or some of them may be varnished and hence insulated.

According to the invention the terminations of the high-voltage and low-voltage windings can either be of joint type (when the connection is to a cable system) or of cable termination type (when the connection is to a switchgear or to an overhead transmission line). These parts also consist of solid insulation material, thus fulfilling the same PD demands as the whole insulation system.

According to the invention the transformer/reactor can either have external or internal cooling, external meaning gas or liquid cooling on earth potential and internal meaning gas or liquid cooling inside the winding.

Manufacturing transformer or reactor windings of a cable according to the above, entails drastic differences as regards the electric field distribution between conventional power transformers/reactors and a power transformer/reactor according to the invention. The decisive advantage with a cable-formed winding according to the invention is that the electric field is enclosed in the winding and that there is thus no electric field outside the outer semiconducting layer. The electric field from the current-carrying conductor is present only in the solid main insulation. Both from the design point of view and the manufacturing point of view this has considerable advantages:

- the windings of the transformer may be formed without having to consider any electric field distribution and the transposition of strands, mentioned under the background art, is omitted;
- the core design of the transformer may be formed without having to consider any electric field distribution;
- no oil is needed for electrical insulation of the winding, i.e., the medium surrounding the winding may be air;
- no oil is needed for cooling of the winding. The cooling can be performed on ground potential and as cooling medium a gas or a liquid can be used;
- no special connections are required for electrical connection between the outer connections of the transformer and the immediately connected coils/windings, since the electrical connection, contrary to conventional plants, is integrated with the winding;
- traditional transformer/reactor bushings are not necessary. Instead, field conversion from radial to axial field outside the transformer/reactor can be realized similar as for a traditional cable termination;
- the manufacturing and testing technology which is needed for a power transformer according to the invention is considerably simpler than for a conventional power transformer/reactor since the impregnation, drying and vacuum treatments described under the description of the background art are not needed. This provides considerably shorter production times;
- by using the technique for insulation, according to the invention, considerable possibilities are provided for developing the magnetic circuit of the transformer, which was given according to the prior art.

BRIEF DESCRIPTION OF THE DRAWINGS

The invention will now be described with reference to the accompanying drawings, wherein.

DESCRIPTION OF THE PREFERRED EMBODIMENTS

Figure 1:
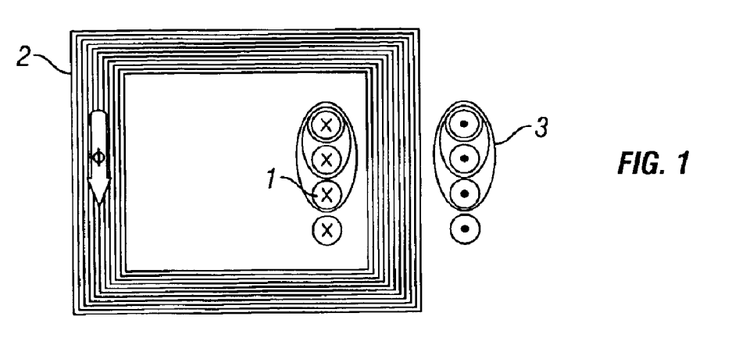
FIG. 1 shows the electric field distribution around a winding of a conventional power transformer/reactor.

FIG. 1 shows a simplified and fundamental view of the electric field distribution around a winding of a conventional power transformer/reactor, where 1 is a winding and 2 a core and 3 illustrates equipotential lines, i.e., lines where the electric field has the same magnitude. The lower part of the winding is assumed to be at earth potential.

The potential distribution determines the composition of the insulation system since it is necessary to have sufficient insulation both between adjacent turns of the winding and between each turn and earth. The figure thus shows that the upper part of the winding is subjected to the highest dielectric stress. The design and location of a winding relative to the core are in this way determined substantially by the electric field distribution in the core window.

FIG. 2 shows an example of a cable which may be used in the windings which are included in power transformers/reactors according to the invention. Such a cable comprises at least one conductor 4 consisting of a number of strands 5 with an inner semiconducting layer 6 disposed around the strands. Outside of this inner semiconducting layer is the main insulation 7 of the cable in the form of a solid insulation, and surrounding this solid insulation is an outer semiconducting layer 8. As previously mentioned, the cable may be provided with other additional layers for special purposes, for example for preventing too high electric stresses on other regions of the transformer/reactor. From the point of view of geometrical dimension, the cables in question will have a conductor area which is between 30 and 3000 $mm^2$ and an outer cable diameter which is between 20 and 250 mm.

Figure 3:
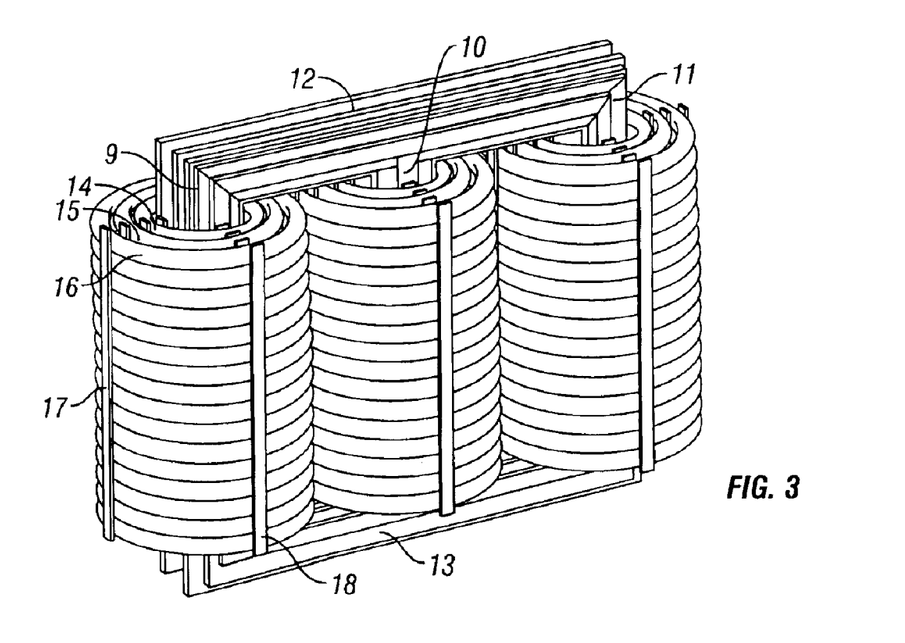
FIG. 3 shows an embodiment of a power transformer according to the invention.

The windings of the power transformer/reactor manufactured from the cable described from the summary of the invention may be used both for single-phase, three-phase and poly-phase transformers/reactors independently of how the core is shaped. One embodiment is shown in FIG. 3 which shows a three-phase laminated core transformer. The core comprises, in conventional manner, three core limbs 9, 10 and 11 and the retaining yokes 12 and 13. In the embodiment shown, both the core limb and the yokes have a tapering cross section. A power transformer according to the invention may also be formed without of the core, i.e., the transformer may have a so-called air wound winding.

Concentrically around the core limbs, the windings formed with the cable are located. As is clear, the embodiment shown in FIG. 3 has three concentric winding turns 14, 15 and 16. The innermost winding turn 14 may represent the primary winding and the other two winding turns 15 and 16 may represent secondary windings. In order not to overload the figure with too many details, the connections of the windings are not shown. Otherwise the figure shows that, in the embodiment shown, spacing bars 17 and 18 with several different functions are located at certain points around the windings. The spacing bars may be formed of insulating material intended to provide a certain space between the concentric winding turns for cooling, supporting, etc. They may also be formed of electrically conducting material in order to form part of the earthing system of the windings.

What is claimed is:

1. A power transformer/reactor having at least one winding, comprising a flexible cable having a current-carrying conductor including a plurality of insulated strands and at least one uninsulated strand; and an insulation system including a first layer having semiconducting properties surrounding the conductor and being in contact therewith; a solid insulating layer surrounding the first layer; and a second layer with semiconducting properties surrounding the insulating layer.

2. A power transformer/reactor according to claim 1, wherein the first layer is at substantially the same potential as the conductor.

3. A power transformer/reactor according to claim 1, wherein the second layer comprises an equipotential surface surrounding the conductor.

4. A power transformer/reactor according to claim 1, wherein the second layer is connectable to earth potential.

5. A power transformer/reactor according to claim 1, wherein the first and second semiconducting layers and the insulating layer have substantially the same coefficient of thermal expansion such that, upon a thermal movement in the winding, defects, cracks or the like do not arise in the boundary layer between the semiconducting layers and the insulating part.

6. A power transformer/reactor according to claim 1, wherein the first and second layers have respective contact surfaces secured to corresponding surfaces of the adjacent insulating layer each of the semiconducting layers is secured to the adjacent solid insulating layer along essentially the whole contact surface.

7. A power transformer/reactor according to claim 1, wherein the cable is manufactured with a conductor area which is between about 30 and 3000 mm$^2$ and with an outer cable diameter which is between about 20 and 250 mm.

8. A power transformer/reactor according to claim 1, wherein at least one of the first and second layers and the solid insulation comprise polymeric materials.

9. A power transformer/reactor according to claim 1, wherein the winding is free of partial discharge.

10. A power transformer/reactor according to claim 1, wherein the solid insulation comprises an extrusion.

11. A power transformer/reactor according to claim 1, wherein the cable is substantially void free.

12. A power transformer/reactor according to claim 1, wherein the power transformer/reactor comprises a core of magnetic material.

13. A power transformer/reactor according to claim 1, wherein the power transformer/reactor comprises an iron core including core limbs and yokes.

14. A power transformer/reactor according to claim 1 wherein the power transformer/reactor is air wound and formed without an iron core.

15. A power transformer/reactor according to claim 1, further comprising at least two galvanically separated concentrically wound windings.

16. A power transformer/reactor according to claim 1, wherein the power transformer/reactor is connectable to a plurality of voltage levels.

17. A power transformer/reactor according to claim 1, wherein the windings include terminals in the form of power cable terminations.

18. A power transformer/reactor or according to claim 1, wherein the insulation layer is formed of a solid electrical insulation, substantially all of the electrical insulation in the transformer/reactor is enclosed between the conductor and the second layer of the windings.

19. A power transformer/reactor according to claim 1, wherein the cables includes means for sustaining a high voltage at transmission levels of at least one of greater than 10 kV.

20. A power transformer/reactor according to claim 1, wherein the transformer/reactor is designed for a power range in excess of 0.5 MVA.

21. A power transformer/reactor according to claim 1, wherein the power transformer/reactor includes cooling means comprising at least one of liquid and gas at earth potential.

22. A method for electric field control in a power transformer/reactor comprising the steps of:
forming a magnetic field generating circuit having at least one winding in the form of a flexible cable having at least one electrical conductor and insulation system surrounding the conductor;
forming the conductor with a plurality of insulated conductive strands and at least one uninsulated conductive strand;
forming the insulation system of an inner semiconducting layer contacting the conductor, a solid insulation surrounding the inner layer; and an outer layer surrounding the solid insulation being connected to ground or otherwise a relatively low potential and having an electrical conductivity higher than the conductivity of the insulation but lower than the conductivity of the electrical conductor so as to equalize potential and cause the electrical field to be substantially enclosed in the winding internally of the outer layer.

23. A method according to claim 22, wherein the winding of the transformer/reactor is assembled on-site.

24. A method according to claim 22, further comprising connecting the outer layer to near ground potential.

25. A high voltage electric machine comprising at least one of a transformer and reactor including a winding in the form of a flexible cable including at least one current-carrying conductor comprising a plurality of insulated strands and at least one uninsulated strand; and a magnetically permeable, electric field confining cover surrounding the conductor, said cable forming at least one uninterrupted turn in the corresponding winding of said machine; and wherein the cover comprises an insulating surrounding the conductor and an outer layer surrounding the insulating system including an inner semiconducting layer in contact with the conductor, and a solid insulation layer, surrounding the inner layer an an layer having a conductivity sufficient to establish an equipoential surface surrounding the conductor.

26. The machine of claim 25, wherein the insulation system is substantially void free.

27. The machine of claim 25, wherein the inner layer, the outer layer and the solid insulation layer have substantially the same temperature coefficient of expansion.

28. The machine of claim 25, wherein the winding is operable free of partial discharge.

29. The machine of claim 25, wherein the winding comprises multiple uninterrupted turns.

30. The machine of claim 25, wherein the cable comprises a transmission line.

* * * * *